(12) United States Patent
Kasahara (10) Patent No.: US 8,417,031 B2
(45) Date of Patent: Apr. 9, 2013

(54) IMAGE PROCESSING APPARATUS AND METHOD

(75) Inventor: Ryosuke Kasahara, Yokohamai (JP)

(73) Assignee: Ricoh Company, Ltd., Tokyo (JP)

( * ) Notice: Subject to any disclaimer, the term of this patent is extended or adjusted under 35 U.S.C. 154(b) by 1055 days.

(21) Appl. No.: 12/379,889

(22) Filed: Mar. 4, 2009

(65) Prior Publication Data

US 2009/0226086 A1    Sep. 10, 2009

(30) Foreign Application Priority Data

Mar. 4, 2008    (JP) .................................. 2008-053718

(51) Int. Cl.
*G06K 9/00*    (2006.01)

(52) U.S. Cl. ....................................................... 382/167

(58) Field of Classification Search .................. None
See application file for complete search history.

(56) References Cited

U.S. PATENT DOCUMENTS

| | | | | |
|---|---|---|---|---|
| 5,398,124 A * | 3/1995 | Hirota | ............................ | 358/530 |
| 5,471,323 A * | 11/1995 | Suetsugi et al. | .............. | 358/511 |
| 5,742,410 A * | 4/1998 | Suzuki | ............................ | 358/518 |
| 6,584,287 B2 * | 6/2003 | Enomoto | ....................... | 396/311 |
| 6,587,224 B1 | 7/2003 | Nabeshima et al. | | |
| 6,603,885 B1 * | 8/2003 | Enomoto | ....................... | 382/263 |
| 6,870,564 B1 * | 3/2005 | Burns | ............................ | 348/263 |
| 6,982,756 B2 * | 1/2006 | Nakamura | .................... | 348/241 |
| 6,999,197 B1 * | 2/2006 | Nabeshima | ..................... | 358/1.9 |
| 7,227,574 B2 * | 6/2007 | Yamanaka | .................... | 348/242 |
| 7,580,070 B2 * | 8/2009 | Yanof et al. | ..................... | 348/246 |
| 7,583,301 B2 * | 9/2009 | Sakurai et al. | ................. | 348/241 |
| 7,649,557 B2 * | 1/2010 | Song et al. | ...................... | 348/252 |
| 7,768,567 B2 * | 8/2010 | Azuma | ........................... | 348/335 |
| 7,801,355 B2 * | 9/2010 | Arazaki | ......................... | 382/162 |
| 7,973,850 B2 * | 7/2011 | Ishiga | ............................. | 348/335 |
| 8,089,529 B2 * | 1/2012 | Kawasaki | .................. | 348/224.1 |
| 8,106,973 B2 * | 1/2012 | Kasahara | ....................... | 348/241 |
| 8,120,666 B2 * | 2/2012 | Kasahara | .................... | 348/222.1 |
| 8,130,418 B2 * | 3/2012 | Ikeda | ............................ | 358/3.26 |
| 8,139,127 B2 * | 3/2012 | Nonaka | .......................... | 348/242 |
| 2002/0008760 A1 * | 1/2002 | Nakamura | ..................... | 348/222 |
| 2003/0007183 A1 * | 1/2003 | Ishiguro | ......................... | 358/2.1 |

(Continued)

FOREIGN PATENT DOCUMENTS

| | | |
|---|---|---|
| EP | 1523172 | 4/2005 |
| JP | 2003-235050 | 8/2003 |

(Continued)

OTHER PUBLICATIONS

Office Action dated Dec. 21, 2011 issued in corresponding Japanese Application No. 2008-053718.

(Continued)

*Primary Examiner* — Chan S Park
*Assistant Examiner* — Sean Motsinger
(74) *Attorney, Agent, or Firm* — Harness, Dickey & Pierce (57) ABSTRACT

An image processing method of processing an image obtained by using an optical system having a wide field angle and a large magnification chromatic aberration includes the steps of applying magnification chromatic aberration correction processing to the image, applying separation processing to the image after the step of applying the magnification chromatic aberration correction for separating the image into a brightness signal and a color signal, and applying a high band emphasis processing only to the brightness signal after the step of applying the separation processing.

18 Claims, 9 Drawing Sheets

U.S. PATENT DOCUMENTS

| | | |
|---|---|---|
| 2003/0184659 A1 | 10/2003 | Skow |
| 2004/0085459 A1* | 5/2004 | Hoshuyama et al. ...... 348/223.1 |
| 2004/0150732 A1* | 8/2004 | Yamanaka .................... 348/272 |
| 2004/0227978 A1 | 11/2004 | Enomoto |
| 2004/0247201 A1 | 12/2004 | Arazaki |
| 2005/0111110 A1* | 5/2005 | Matama ........................ 359/687 |
| 2005/0190200 A1* | 9/2005 | Arazaki ........................ 345/600 |
| 2006/0274170 A1* | 12/2006 | Azuma .......................... 348/246 |
| 2008/0007630 A1* | 1/2008 | Hara ........................... 348/223.1 |
| 2008/0129845 A1* | 6/2008 | Azuma .......................... 348/241 |
| 2008/0136943 A1* | 6/2008 | Azuma .................... 348/231.99 |
| 2009/0051976 A1* | 2/2009 | Ikeda ........................... 358/448 |
| 2009/0207276 A1* | 8/2009 | Kawasaki ................. 348/229.1 |

FOREIGN PATENT DOCUMENTS

| | | |
|---|---|---|
| JP | 2004-241991 | 8/2004 |
| JP | 2004-336106 | 11/2004 |
| JP | 2006-345054 | 12/2006 |
| JP | 2008-015946 | 1/2008 |
| WO | WO 8505526 | 12/1985 |

OTHER PUBLICATIONS

A European Search Report dated Jul. 9, 2009 issued in the corresponding Application No. EP 09154262.1-2202.

* cited by examiner

MAGNIFICATION CHROMATIC ABERRATION CORRECTION

FIG. 9B

DISTORTION CORRECTION

FIG. 10

EXEMPLARY CONFIGURATION OF MAGNIFICATION
CHROMATIC ABERRATION CORRECTION DEVICE

FIG. 11A

EXEMPLARY CONFIGURATION OF MAGNIFICATION CHROMATIC ABERRATION CORRECTION COORDINATE CONVERSION CALCULATION SECTION

FIG. 11B

EXEMPLARY CONFIGURATION OF MAGNIFICATION CHROMATIC ABERRATION CORRECTION COORDINATE CONVERSION CALCULATION SECTION

FIG. 11C

EXEMPLARY CONFIGURATION OF MAGNIFICATION CHROMATIC ABERRATION CORRECTION COORDINATE CONVERSION CALCULATION SECTION

FIG. 12

EXEMPLARY CONFIGURATION OF
DISTORTION CORRECTION DEVICE

FIG. 13

IMAGE PROCESSING APPARATUS AND METHOD

CROSS REFERENCE TO RELATED APPLICATION

This application claims priority under 35 USC §119 to Japanese Patent Application No. 2008-053718, filed on Mar. 4, 2008, the entire contents of which are herein incorporated by reference.

BACKGROUND OF THE INVENTION

1. Field of the Invention

The present invention relates to an image processing method and an image processing apparatus, and in particular to an image processing method and an image processing apparatus capable of processing images obtained by a wide-angle optical system correcting a large magnification chromatic aberration.

2. Discussion of the Background Art

Recently, a wide angle imaging apparatus is increasingly demanded as a rear monitor of cars. However, the wider the angle, the larger either a magnification chromatic aberration or a distortion. Thus, the optical system is hardly designed suppressing an aberration. Thus, a performance should be improved by additionally employing image processing. As a conventional technology of correcting an error in an imaging apparatus that employs an optical system having a magnification chromatic aberration and a distortion, the Japanese Patent Application Laid Open No. 2006-345054 describes a method of simultaneously correcting both of the magnification chromatic aberration and the distortion by independently converting a coordinate of each of RGB signals obtained by an imaging element, such as a CCD, a CMOS sensor, etc., per component color of RGB at a later step. Also described is a method of only correcting the distortion by collectively converting respective component colors of RGB at once neglecting the magnification chromatic aberration.

Further, a high band emphasis filter (e.g. MTF correction) is conventionally used for the purpose of correcting deterioration of resolution caused by an optical system, such as a lens, etc.

For example, the Japanese Patent Application Laid Open No. 2006-345054 discusses a method of applying high band emphasis filtering to each of RGB signals per RGB after correcting a magnification chromatic aberration and a distortion of RGB signals. Also discussed there is that RGB signals are separated into brightness and color signals and aberration correction is executed, and then high band emphasis filtering is applied to the brightness signal and the like.

However, the former method introduces a large-scale circuit due to combination of a high band emphasis filter and an aberration correction circuit per each of RGB with poor image quality due to increase of color noise.

The latter method can avoid increase of color noise indeed, but disables correction of the magnification chromatic aberration that is generally enabled by independently correcting an aberration per each of RGB for the purpose of coordinate conversion of brightness and color signals other than RGB signals.

SUMMARY OF THE INVENTION

The present invention has been made in view of the above noted and another problems and one object of the present invention is to provide a new and noble image processing method.

Such a new and noble image processing method comprises the steps of applying a magnification chromatic aberration correction processing to an image, applying a separation processing to the image for separating the image into a brightness signal and a color signal after the step of applying the magnification chromatic aberration correction, and applying a high band emphasis processing only to the brightness signal after the step of applying the separation processing.

In another aspect, the method further comprises the step of combining the brightness signal subjected to the high band emphasis processing with the color signal.

In yet another aspect, the method further comprises the step of smoothing the color signal in parallel to the step of applying the high band emphasis processing to the brightness signal.

In yet another aspect, the method further comprises the step of changing an intensity of the smoothing the color signal in accordance with a luminance of a photographic subject.

In yet another aspect, the step of smoothing the color signal is executed only when the luminance decreases to a prescribed dark level.

In yet another aspect, the magnification chromatic aberration is corrected by partially converting coordinates of multi color components in the step of executing the magnification chromatic aberration correction processing.

In yet another aspect, a coordinate conversion amount of a first color component is obtained with reference to a coordinate of a reference color component, and a coordinate conversion amount of a second color component is calculated in accordance with the coordinate conversion amount of the first color component.

In yet another aspect, the distortion correction processing is executed separately from the magnification chromatic aberration correction processing.

In yet another aspect, the distortion correction processing is executed in the later step of the high band emphasis processing.

In yet another aspect, the distortion correction processing is executed simultaneously with the magnification chromatic aberration correction processing.

ADVANTAGE

According to one embodiment of the present invention, an image processing method and apparatus capable of correcting magnification chromatic aberration and MTF can be provided downsizing a circuit while suppressing deterioration of image quality

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 13 is a block chart entirely illustrating an exemplary image forming apparatus, which the present invention is applied to

PREFERRED EMBODIMENTS OF THE PRESENT INVENTION

Figure 1:
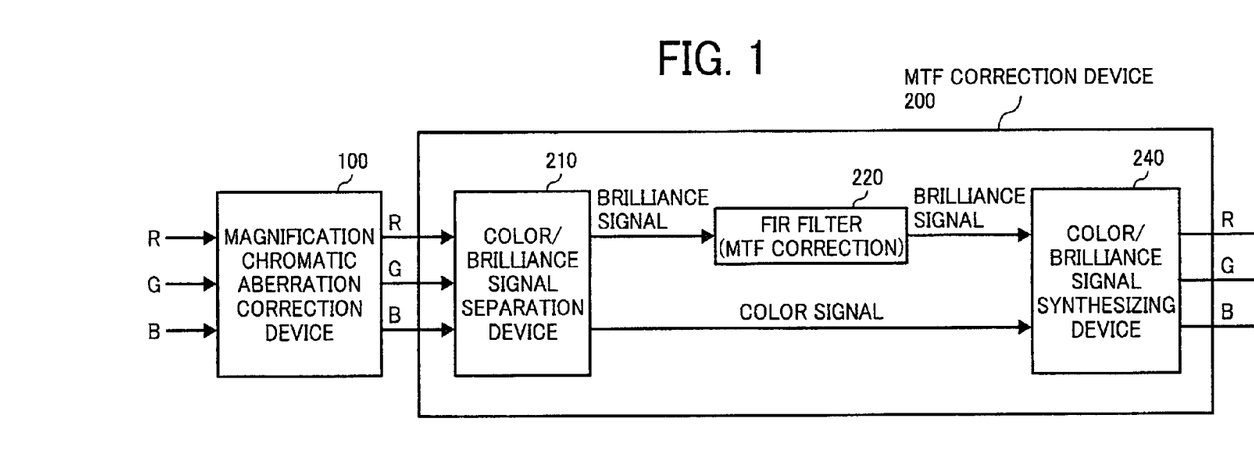
FIG. 1 is a block chart illustrating an exemplary function of an image processing apparatus according to the first embodiment of the present invention.

Referring now to the drawings, wherein like reference numerals and marks designate identical or corresponding parts throughout several figures, in particular in FIG. 1, an image processing apparatus is described, in which color components of either addition three primitive colors of Red, Green, and Blue or subtraction three primitive colors of Yellow, Magenta, and Cyan is employed.

As shown, the image processing apparatus includes a magnification chromatic aberration correction device 100 and a MTF correction device 200. The MTF correction device 200 includes a color/brightness signal separation device 210, a high band emphasis filter (FIR filter) 220, and a color/brightness signal combination device 240.

The magnification chromatic aberration correction device 100 receives RGB image data having a magnification chromatic aberration, which is obtained by photographing with a wide angle optical system having a large magnification chromatic aberration and is read by an imaging element, such as a CCD, a CMOS sensor, etc. The magnification chromatic aberration correction device 100 then converts a coordinate of RGB image data separately using a prescribed polynomial or the like and outputs RGB image data having been subjected to the magnification chromatic aberration correction. The magnification chromatic aberration correction device 100 mentioned later in detail can employ a memory of a small capacity and low latency or a memory such as a SRAM having plural ports and low capacity.

The MTF correction device 200 receives and separates RGB pixel data subjected to the magnification chromatic aberration correction to a brightness signal and a color signal using the color/brightness signal separation device 210. The MTF correction device 200 applies high band emphasis processing (e.g. MTF correction) to the brightness signal using the FIR filter 220 and combines the brightness signal subjected to the high band emphasis and the color signal in a color/brightness signal-combining device 240. The MTF correction device 200 then outputs RGB pixel data.

For example, the color/brightness signal separation device 210 separates the RGB pixel data into a brightness signal Y and color signals Cr and Cb using the following formulas:

$$Y=0.299R+0.587G+0.114B \quad (1)$$

$$Cr=0.500R-0.419G+0.081B \quad (2)$$

$$Cr=-0.169R-0.332G+0.500B \quad (3)$$

Figure 2:
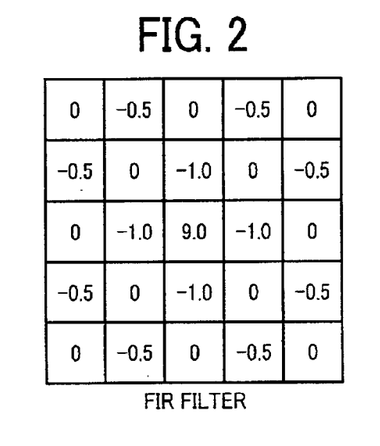
FIG. 2 illustrates an exemplary FIR filter.

The FIR filter 220 includes a (5×5) filter and receives and applies the MTF correction only to the brightness signal Y among the brightness signal Y and the color signals Cr and Cb. By only applying the high band emphasis filtering ((MTF correction) to the Y signal, a high quality image is obtained suppressing color noise. An exemplary coefficient of the FIR filter is illustrated in FIG. 2.

The color/brightness signal combining device 240 receives and combines the high band emphasized brightness signal Y and the color signals Cr and Cb using the following formulas and outputs RGB pixel data:

$$R=Y+1.402Cr \quad (4)$$

$$G=Y-0.714Cr-0.344Cb \quad (5)$$

$$B=Y+1.772Cb \quad (6)$$

With the construction of FIG. 1, the magnification chromatic aberration correction of the RGB can be independently performed appropriately, and the MTF correction of the high band emphasis filtering can only be applied to the brightness signal. As a result, a circuit can be maintained compact while suppressing color noise.

Now, various modifications and improvements of the above-mentioned image processing apparatus are described with reference to FIGS. 3 to 6.

Figure 3:
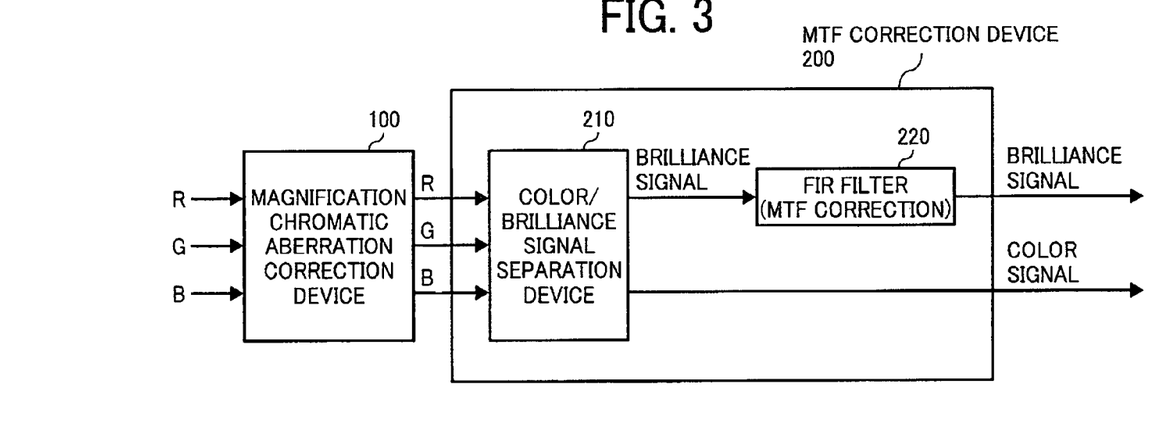
FIG. 3 is a block chart illustrating an exemplary function of an image processing apparatus according to the second embodiment of the present invention.

As shown in FIG. 3, the MTF correction device 200 only includes the color brightness signal device 210 and the FIR filter 220 excluding the color brightness signal-combining device 240. When brightness and color signals excluding RGB signals are preferably outputted to a subsequent stage, the configuration of FIG. 3 is simply employed. The magnification chromatic aberration correction device 100 can be replaced with a magnification chromatic aberration/distortion correction device that independently converts coordinates of RGB image data per component color of RGB and simultaneously corrects the magnification chromatic aberration and distortion. Such replacement can be achieved only by changing parameter of a correction formula (e.g. a coordinate conversion formula).

Figure 4:
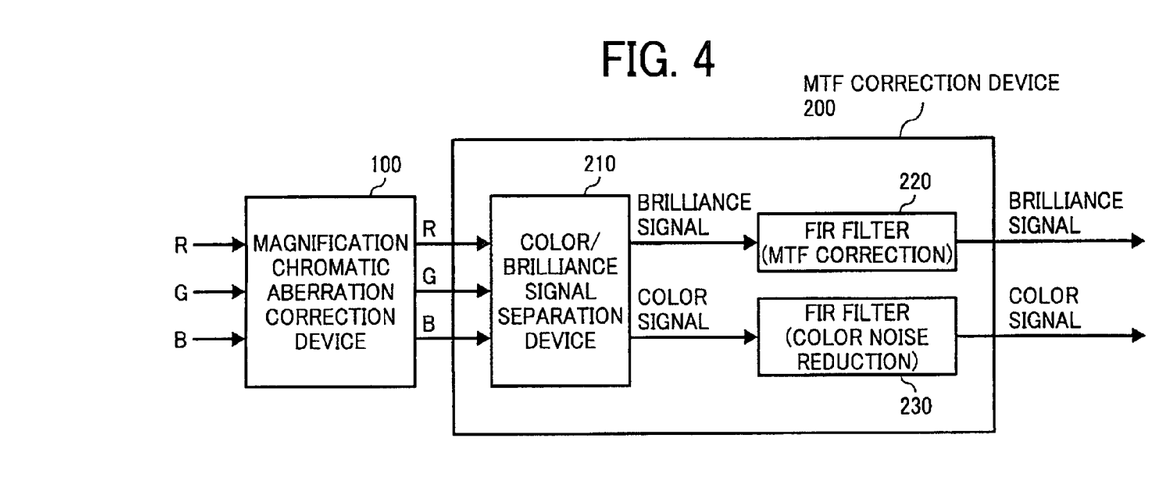
FIG. 4 is a block chart illustrating an exemplary function of an image processing apparatus according to the third embodiment of the present invention.

As shown in FIG. 4, a FIR filter 230 is added to the configuration of FIG. 3 to apply smoothing filtering to a color signal in addition to MTF correction in order to reduce color noise. Also, the magnification chromatic aberration correction device 100 can be replaced with a magnification chromatic aberration/distortion correction device. The FIR filter 230 for the color signal can be substituted by not only a filter that reduces noise but also that capable of improving color saturation by simply adjusting a gain. To improve sensitivity of an imaging element when used for a dark photographing subject or in dark environment, a gain of a signal read from the imaging element is raised. However, in such a situation, the noise increases. Thus, the FIR filter 230 for noise reduction use for color information is used when the gain is high, and accordingly lightness of the photographing subject decreases (i.e., dark). Otherwise, a coefficient of the FIR filter 230 is changed to change smoothing intensity in accordance with the gain (i.e., the lightness of the photographing subject). The lightness of the photographing subject can be directly read by a lightness sensor provided separately. Further, the coefficient of the FIR filter 230 can be changed by selectively employing one of separately equipped FIR filters having a different coefficient from each other in accordance with the gain (i.e., the lightness).

Figure 5:
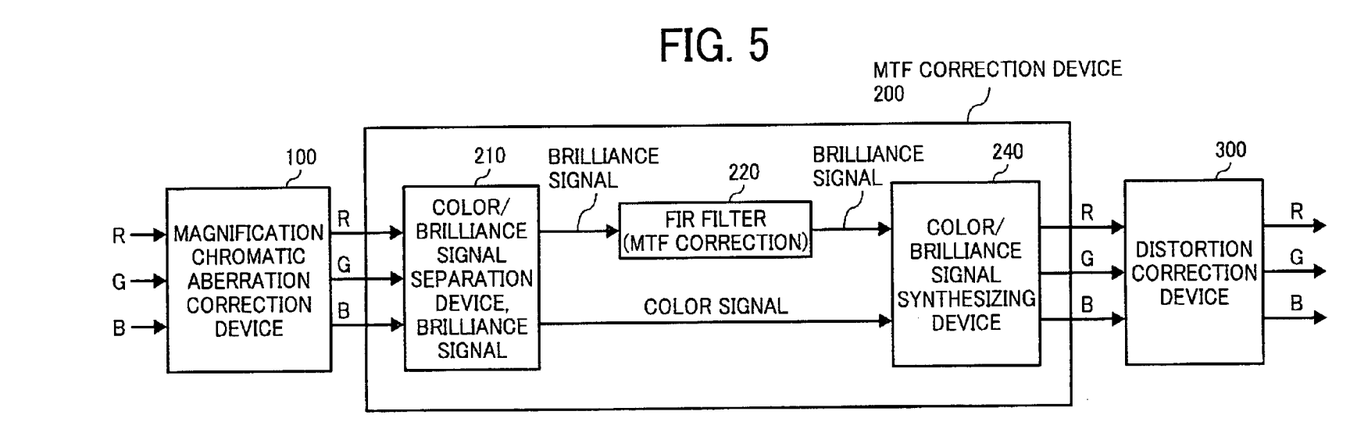
FIG. 5 is a block chart illustrating an exemplary function of an image processing apparatus according to the fourth embodiment of the present invention.

FIG. 5 illustrates another modification in which a distortion correction device 300 is newly added to the configuration of FIG. 1 in the subsequent step of the MTF correction device 200.

The distortion correction device 300, mentioned later in detail, receives RGB image data subjected to magnification chromatic aberration and MTF corrections and commonly applies the coordinate conversion processing to RGB using a prescribed polynomial expression or the like, and outputs RGB image data subjected to the distortion correction.

The magnification chromatic aberration of RGB is different from each other, but the distortion of those are the same. The distortion is significantly larger than the magnification chromatic aberration. By employing the configuration of FIG. 5, a memory, such as a SRAM of a small capacity and low latency, that of a low capacity and multi port, etc., can be used for converting a coordinate for magnification chromatic aberration correction. Whereas a large capacity and high latency memory, such as a DRAM, etc., having a common single port can be used to convert a coordinate for distortion correction. As a result, the entire apparatus can be manufactured at low cost.

Further, when the MTF correction is executed after the distortion correction, an interpolation error created by the coordinate conversion executed for the distortion correction is amplified and thereby affecting image quality. The interpolation error can be reduced by an interpolator that executes interpolation for pixels during the coordinate conversion. However, since the magnification chromatic aberration is relatively smaller than the distortion, affection of an interpolation error to image quality is small in the coordinate conversion for the magnification chromatic aberration correction. Thus, when the magnification chromatic aberration correction, the MTF correction, and the distortion correction are executed in this order as shown in FIG. 5, the interpolation error caused by the distortion correction is not amplified by the MTF correction. Beside, since the magnification chromatic aberration correction and the MTF correction can be executed in this order, the finest image quality can be obtained.

Figure 6:
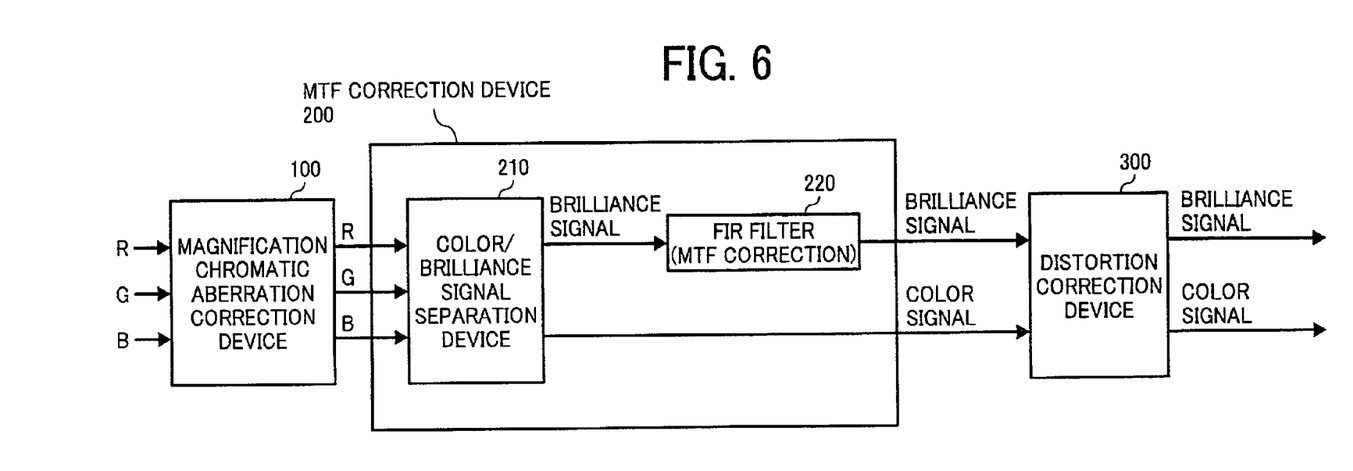
FIG. 6 is a block chart illustrating an exemplary function of an image processing apparatus according to the fifth embodiment of the present invention.

FIG. 6 illustrates still another modification in which a distortion correction device 300 is newly provided in a subsequent stage of the MTF correction device 200 in addition to the configuration of FIG. 3. The distortion correction device 300 executes distortion correction by coordinate conversion for each of a brightness signal and a color signal.

When brightness and color signals excluding RGB signal are preferably outputted to a subsequent stage, the configuration of FIG. 6 is simply preferably employed. Further, a distortion correction device 300 as shown in FIG. 6 can be employed in addition to the configuration of FIG. 4.

Now, the magnification chromatic aberration correction device 100 and the distortion correction device 300 are described in more detail starting with their principle.

Figure 7:
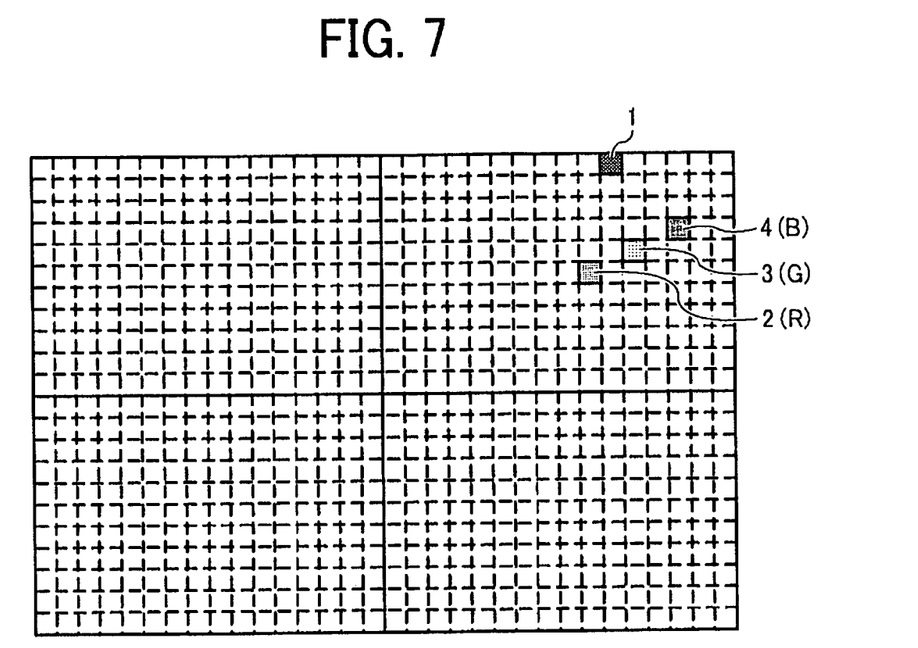
FIG. 7 illustrates an exemplary magnification chromatic aberration and a distortion.

As typically shown in FIG. 7, when an optical system having a magnification chromatic aberration and distortion executes photographing, image data (pixel data) located at a position (pixel) 1 on the right upper screen deviates from an original position due to the distortion, and further differently deviates from each other therefrom due to the magnification chromatic aberration among the respective color components of RGB, thereby positioning at 2(R), 3(G), and 4(B), respectively. The magnification chromatic aberration and the distortion can be corrected by copying image data of RGB color components positioning at 2(R), 3(G), and 4(B), respectively, onto a position 1 (pixel) serving as an original position. That is, the correction is achieved by converting the coordinate. Thus, the positions 2, 3, and 4 serve as coordinate conversion coordinate origins, while the position 1 serves as a coordinate conversion destination.

Since levels of the distortion and the magnification chromatic aberration can be known from design data of an optical system, positions where RGB color components deviate from the origins can be calculated.

Figure 8:
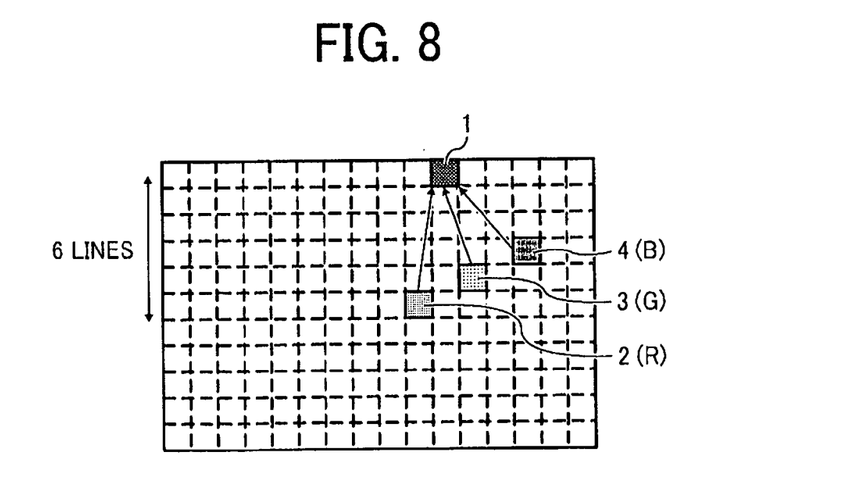
FIG. 8 illustrates exemplary simultaneous corrections of the magnification chromatic aberration and the distortion.

FIG. 8 typically illustrates a method of simultaneously correcting the distortion and the magnification chromatic aberration. As shown, the magnification chromatic aberration and the distortion can be simultaneously corrected by copying image data of RGB components positioning at 2(R), 3(G), and 4(B) (pixel), respectively, on to a position 1 (pixel) serving as an original position of those. That is, the correction is simultaneously executed by converting the coordinate. However, such a method necessitates a large capacity memory of either low latency or a multi port per RGB color component. For example, a six line high-speed memory is needed to convert a coordinate per component color (RGB) in this example.

Figure 9A:
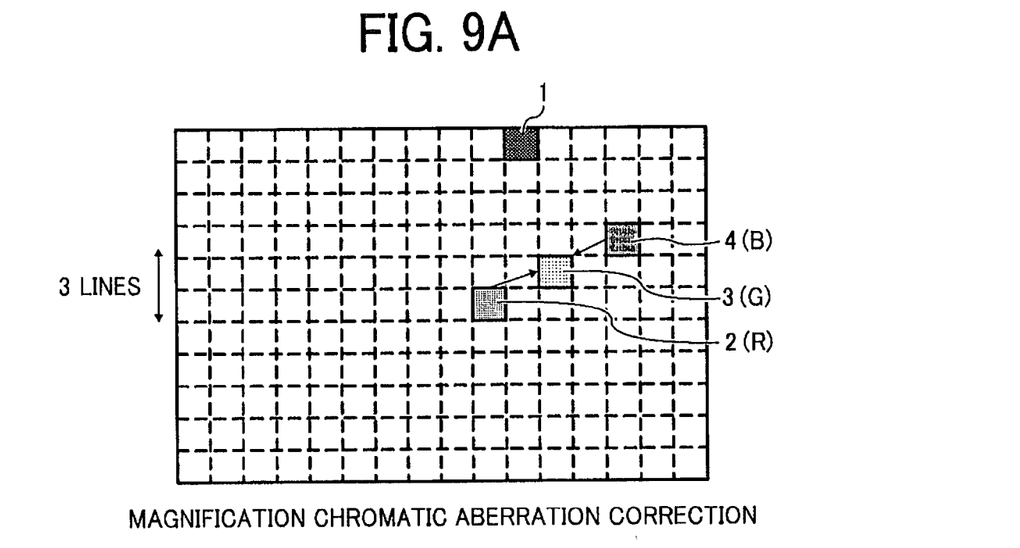
FIGS. 9A and 9B collectively illustrates exemplary independent corrections of the magnification chromatic aberration and the distortion.
Figure 9B:
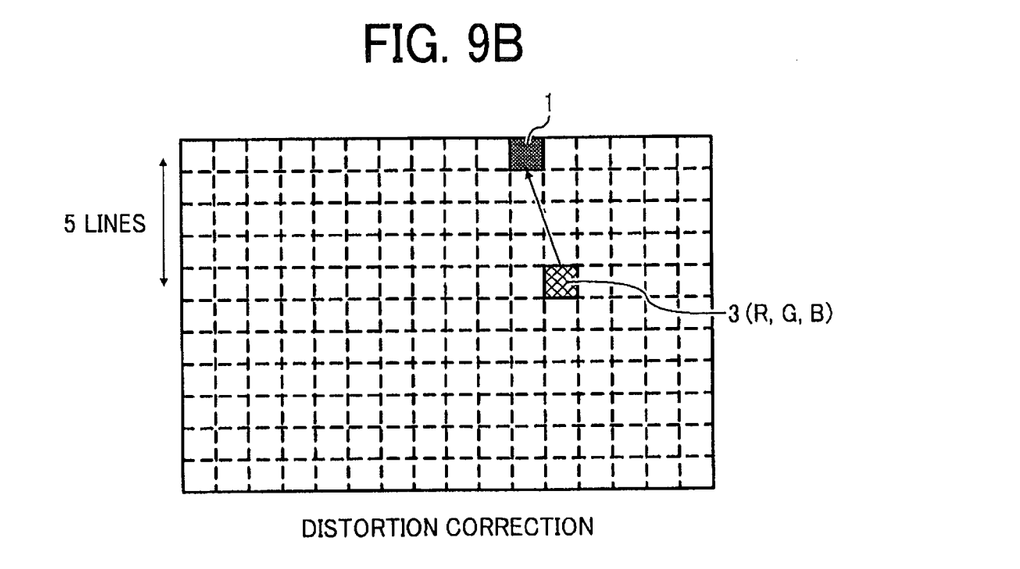

FIG. 9 typically illustrates a method of independently correcting a distortion and a magnification chromatic aberration. The magnification chromatic aberration of the respective RGB color components is different from each other but is small. Whereas the distortion is large but is the same. In view of this, a coordinate of image data of each of the respective RGB color components is initially converted (coordinates of color components of RB are converted and copied onto a position of G component in the later described embodiment) and the magnification chromatic aberration is corrected. Then, the coordinates of RGB image data subjected to the magnification chromatic aberration correction are converted at once so that the distortion is corrected. As a result, coordinate correction use memories can be divided into two. That is, a small capacity and high-speed (low latency or multi port) memory is provided for RGB capable of correcting the magnification chromatic aberration, while a large capacity and low speed (high latency or single port) memory is provided and commonly used by RGB for correcting the distortion. Accordingly, the cost can be reduced as a whole.

FIG. 9A typically illustrates correction of the magnification chromatic aberration. Coordinates of image data of the respective RB color components existing at the positions (pixel) 2(R) and 4(B) are converted and are copied onto a position (pixels) 3(G) of the G component, thereby the magnification chromatic aberration is corrected. FIG. 9B typically illustrates correction of the distortion. Coordinates of image data of the respective RGB color components existing at the position 3 (pixel) having been subjected to magnification chromatic aberration correction are converted in a block, and are copied onto the position (pixel) 1 serving as an original position, thereby the distortion is corrected.

In FIG. 9, the high-speed memory for the magnification chromatic aberration correction use is preferably a three-line memory handling respective RGB. A five-line memory is needed for distortion correction and a low speed memory is employed while a one port is commonly used by the RGB. As a result, the cost can be reduced as a whole in comparison with FIG. 8.

The distortion represents deformation of a lens in relation to a projection system, in which a looked down image is obtained from above a camera or that is partially expanded and displayed.

Figure 10:
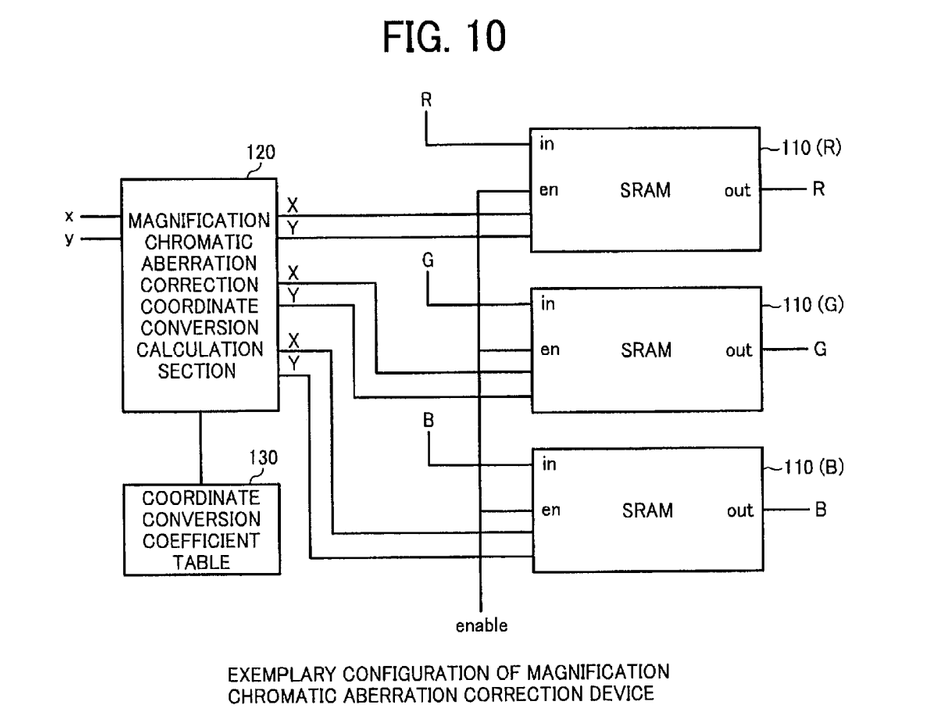
FIG. 10 illustrates an exemplary magnification chromatic aberration correction device.

An exemplary configuration of a magnification chromatic aberration correction device 100 is illustrated in FIG. 10. 110 denotes a magnification chromatic aberration correction use coordinate conversion memory (a line buffer), and respective 110(R), 110(G), and 110(B) correspond to respective RGB color components. 120 denotes a magnification chromatic aberration correction coordinate conversion calculation section that calculates a conversion coordinate for magnification chromatic aberration correction per each of the RGB in accordance with a prescribed coordinate conversion formula. 130 denotes a coordinate conversion coefficient table that stores coefficients used by the prescribed coordinate conversion formula.

To execute the magnification chromatic aberration correction, a small capacity memory having a RGB three ports or that having a low latency is needed as a line buffer. Supposing that the maximum deviation amount of magnification chromatic aberration amounts to twenty lines in the direction Y, each of the coordinate conversion memories 142(R) to 142(B) can include a SRAM having twenty lines.

A size in the direction X is determined by resolution, and it is 640 dots when the resolution is VGA (640×480). Color depth is RGB eight bit, so that writing and reading operations to and from respective coordinate conversion memories 142(R) to 142(B) are executed in a unit of eight bits.

Since each of the magnification chromatic aberration correction use coordinate conversion memories (line buffers) 110(R) to 110(B) has a small capacity, a memory region having twenty lines is preferably maintained using the three port SRAM provided in an image-processing chip. When a low latency memory such as a SRAM is used, a memory having one port can be used as a three-port memory by time-sharing.

Respective RGB image data subjected to magnification chromatic aberration correction are sequentially written into the coordinate conversion memories 110(R) to 110(B) from the leading line thereof in accordance with a coordinate value (x, y). When each of the image data of the twenty lines are written, the image data are sequentially disposed from the leading line and image data of subsequent lines are newly written. In this way, the coordinate conversion memories 110(R) to 110(B) are sequentially stored with the RGB image data having maximum twenty lines needed for magnification chromatic aberration correction coordinate conversion, respectively.

The coordinate value (x, y) represents a position for reading a photograph image of one frame. Where as since the coordinate conversion memories 110(R) to 110(B) are the twenty line buffers and a writing line varies in a cyclic, the coordinate value (x, y) cannot be used as is as a writing address of each of the coordinate conversion memories 110(R) to 110(B). For this reason, the coordinate value (x, y) needs to be converted into an actual address of each of the coordinate conversion memories 110(R) to 110(B). However, a configuration therefor is not shown in FIG. 10. It is the same in a relation between a coordinate value (x, y) subjected to conversion in a reading operation as mentioned later and a reading address of each of the coordinate conversion memories 110(R) to 110(B).

The magnification chromatic aberration correction coordinate conversion calculation section 120 receives the coordinate value (x, y) serving as a coordinate conversion destination coordinate and calculates a conversion coordinate for magnification chromatic aberration correction per each of the RGB. The aberration correction coordinate conversion calculation section 120 then outputs a coordinate (X, Y) serving as a coordinate conversion origin coordinate per each of the RGB.

As shown in FIG. 9A, coordinates of color components RB are converted and copied onto a position of a G component. Thus, the magnification chromatic aberration correction coordinate conversion calculation section 120 outputs the coordinate value (x, y) as is as the coordinate value (X, Y) for the G color component. Whereas the magnification chromatic aberration correction coordinate conversion calculation section 120 converts the coordinate value (x, y) into the coordinate value (X, Y) using a prescribed coordinate conversion formula and outputs the same for the RB color components. The magnification chromatic aberration correction coordinate conversion calculation section 120 repeats this per coordinate value (x, y).

Such a coordinate conversion formula can be represented as follows premising that a center of the screen serves as a original point, wherein abs( ) represents an absolute value, and a(1) to a(4) and b(1) to b(4) represent coordinate conversion coefficients;

$$X=x+(a(1)+a(2)\times abs(x)+a(3)\times abs(y)+a(4)\times y^2)\times (x)$$
$$Y=y+(b(1)+b(2)\times abs(y)+b(3)\times abs(x)+b(4)\times x^2)\times (y) \quad (7)$$

The coordinate conversion coefficients are previously stored in a coordinate conversion coefficient table 130.

The coordinate conversion memories 110(R) to 110(B) each sequentially reads the respective RGB image data based on a coordinate value (X, Y) outputted from the magnification chromatic aberration correction coordinate conversion calculation section 120 (precisely, an address converted coordinate value (X, Y)) in parallel to a writing operation (precisely, with a prescribed delay). In such a situation, in the coordinate conversion memory 110G, the G component image data are read from the same position as written. In the coordinate conversion memories 110R and 110B, R and B color component image data are read from positions deviated from the writing position by a difference of a magnification chromatic aberration, respectively.

Hence, the RGB image data subjected to the magnification chromatic aberration correction are outputted from the coordinate conversion memories 110R to 110B, respectively. Specifically, the RGB image data of the coordinate conversion origin coordinate value (X, Y) are outputted as RGB image data of the coordinate conversion destination coordinate value (x, y).

Now, several examples of the magnification chromatic aberration correction coordinate conversion calculation section 120 are described with reference to FIGS. 11A to 11C. In an example of FIG. 11A, a G color component is not subjected to coordinate conversion and a coordinate value (x, y) is outputted as is as inputted as a G color use coordinate (X, Y). Whereas only coordinate values (x, y) of RB color components are subjected to coordinate conversion in coordinate conversion calculation sections 121 and 122 and are outputted as a R use coordinate value (X, Y) and a B use coordinate value (X, Y), respectively. The circuit of the coordinate conversion calculation section is compact because of only handling the R and B color components.

Figure 11A:
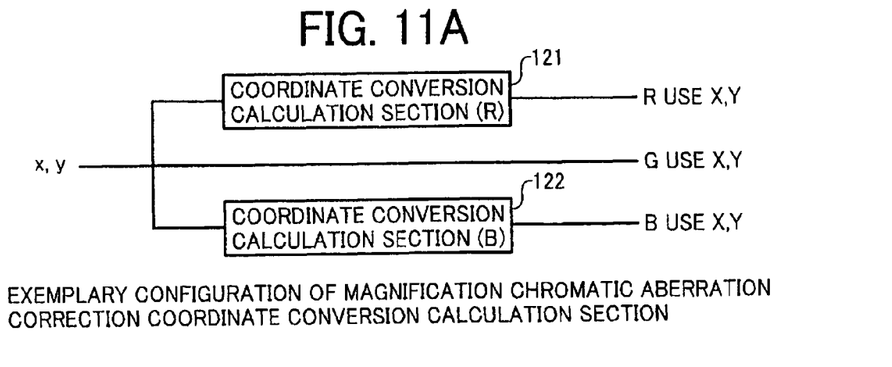
FIGS. 11A to 11C collectively illustrates an exemplary magnification chromatic aberration correction coordinate conversion calculation section employed in each of the embodiments.
Figure 11B:
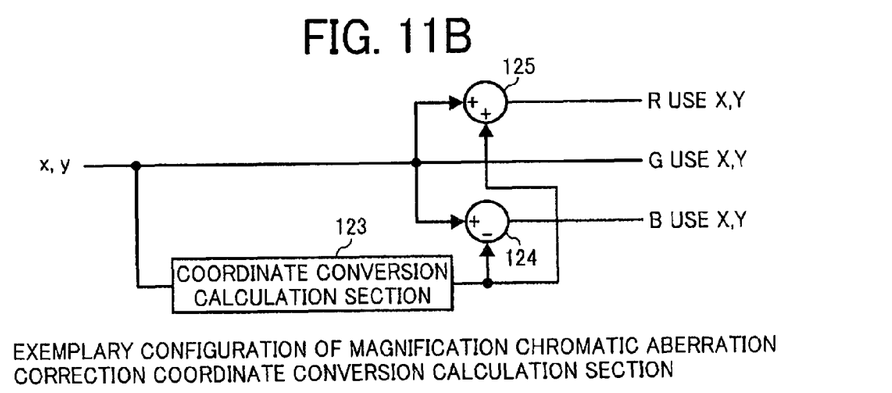
Figure 11C:
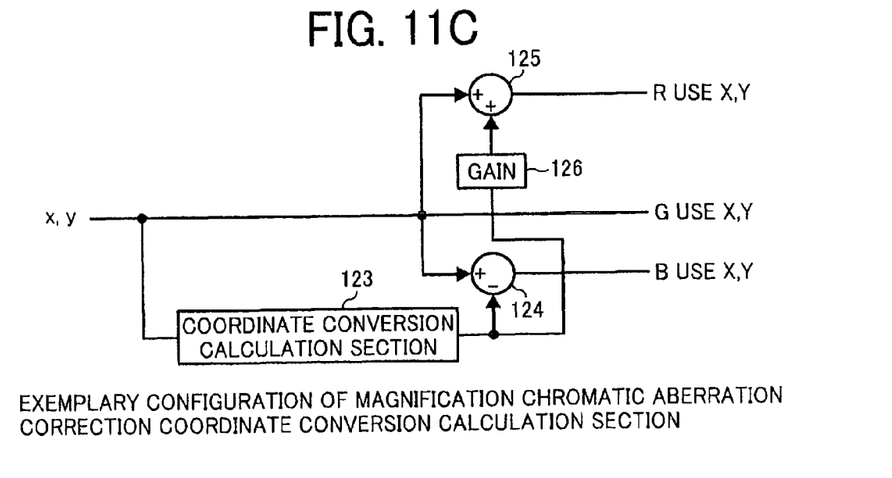

Examples of FIGS. 11B and 11C pay attention to the fact that components of R and B colors symmetrically deviate from a component of G color serving as a deviation center (see FIG. 7). As shown in FIG. 11B, a correction value as to a coordinate value (x, y) is calculated by the coordinate conversion calculation section 123, and a B use coordinate value (X,Y) is obtained by subtracting the correction value from the coordinate value (x, y) in a subtraction section 124, while a R use coordinate value (X,Y) is obtained by adding the correction value to the coordinate value (x, y) in an addition section 125. As in the example of FIG. 11A, a coordinate value (x, y) is outputted as is inputted to the G use coordinate value (X,Y).

Considering deviation at a symmetrical position, a gain circuit 126 is provided to adjust a R use correction amount as shown in FIG. 11C. The gain circuit 126 can be arranged on the B color component side. According to the examples of FIGS. 11B and 11C, only one coordinate conversion calculation section is needed thereby further downsizing the circuit.

In place of the coordinate conversion calculation sections 121 and 122 of FIG. 11A, a look up table (LUT) storing a correspondence of an input coordinate value (x, y) to an output coordinate value (X, Y) is provided for each of R and B, and a coordinate value (X, Y) of a coordinate conversion origin corresponding to a coordinate value (x, y) of coordinate conversion destination can directly be obtained using the LUT. Similarly, in place of the coordinate conversion calculation section 123 of FIGS. 11B and 11C, a look up table (LUT) storing a correspondence of an input coordinate value (x, y) to a correction amount is provided, and a correction amount corresponding to the coordinate value (x, y) can directly be obtained using the LUT. Thus, calculation for coordinate conversion can be omitted, so that magnification chromatic aberration correction can essentially be achieved only by a memory chip.

Now, an exemplary distortion correction section 300 (FIG. 5) is described with reference to FIG. 12. 310 denotes a RGB combining section for combining three RGB image data into one. 320 denotes a distortion correction use coordinate conversion memory commonly used for RGB image data. 163 denotes a RGB separation section for separating combined RGB image data into respective original color components. 340 denotes a distortion correction coordinate conversion calculation section for calculating a conversion coordinate for distortion correction in accordance with a prescribed coordinate conversion formula. 350 denotes a coordinate conversion coefficient table storing coefficients used in the coordinate conversion formula.

Since a distortion largely deviates a pixel, a buffer memory at most storing image data of one screen is needed for the distortion correction. Since a deviation amount is the same among the respective RGB color components, only one buffer memory having a bit width corresponding to the total of RGB image data is needed. For example, it is premised in this embodiment that resolution amounts to VGA (640×480), each of bit numbers (color depth) of RGB image data is eight, and the coordinate conversion memory 320 includes a DRAM having 640×480 dot capable of writing and reading in a unit of twenty-four bits.

In this way, since the distortion correction use coordinate conversion memory 320 necessitates an extraordinary large capacity, such a SRAM is hardly provided in an image-processing chip in view of cost. In addition, since only one port memory is needed for handling the RGB, a DRAM provided outside the image-processing chip is preferably used.

The RGB combining section 310 sequentially receives respective RGB image data (eight bit) already subjected to magnification chromatic aberration correction and combines them into image data (twenty-four bit) and outputs the same. The thus combined RGB image data are sequentially written into the coordinate conversion memory 320 starting from the leading line in accordance with the coordinate values (x, y) of the respective coordinate conversion destinations.

The distortion correction coordinate conversion calculation section 340 receives the coordinate value (x, y) of the coordinate conversion destination, and calculates a conversion coordinate for distortion correction commonly used for the RGB, and outputs a coordinate value (X, Y) of the coordinate conversion origin.

The coordinate conversion formula can be the formula 13 used in the magnification chromatic aberration correction as mentioned earlier. However, coordinate conversion coefficients used there are of course different from those in the formula. Such coordinate conversion coefficients can previously be stored in a coordinate conversion coefficient table 350.

In parallel to the writing operation of the earlier mentioned RGB combination image data (twenty four bit) (precisely with a prescribed delay), the RGB combination image data are sequentially read in accordance with the coordinate value (X, Y) outputted from the distortion correction coordinate conversion section 340. The RGB separation section 330 separates the RGB combination image data (24 bit) read from the coordinate conversion memory 320 into image data (8 bit) of the RGB original color components.

Hence, the RGB separation section 330 outputs respective RGB image data subjected to the distortion correction. Specifically, the respective RGB image data are copied onto the original positions of the coordinate value (x, y).

Also in the distortion correction processing, a lookup table (LUT) storing correspondence of an input coordinate value (x, y) to an output coordinate value (X, Y) is provided, and a coordinate value (X, Y) of a coordinate conversion origin corresponding to a coordinate value (x, y) of a coordinate conversion destination can directly be obtained using the LUT. Thus, calculation for the coordinate conversion can be omitted, and the distortion correction can essentially be achieved only by a memory chip.

Figure 12:
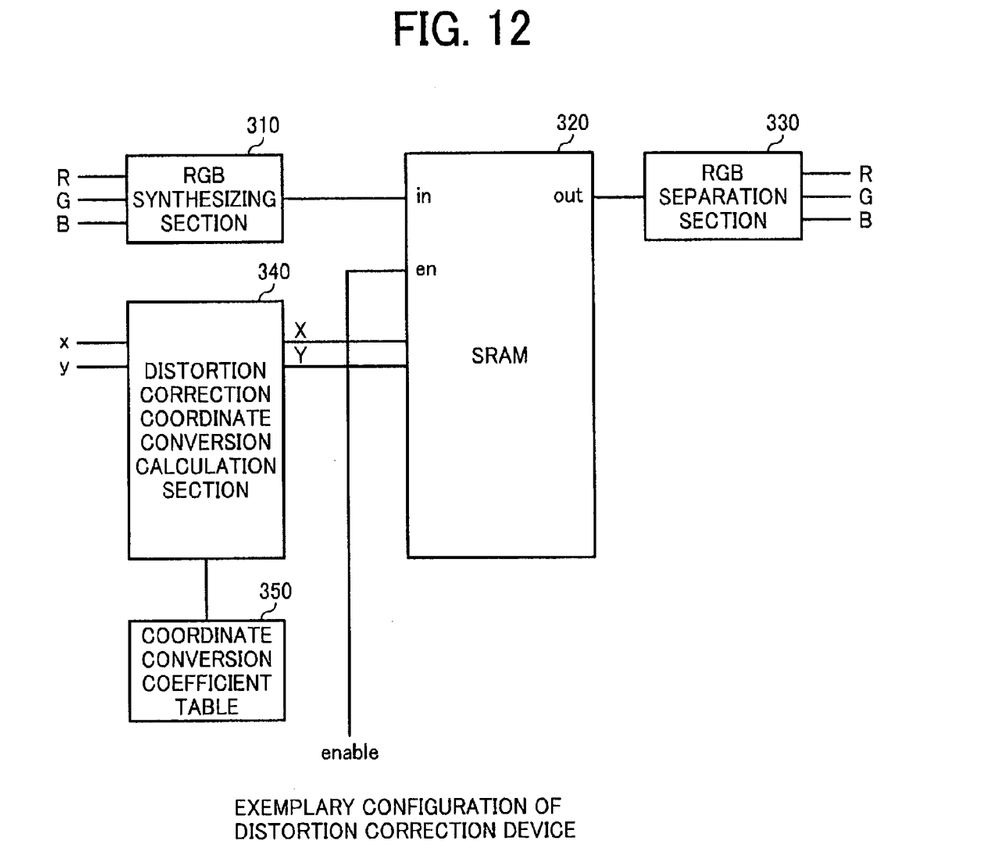
FIG. 12 illustrates an exemplary distortion correction device.

As shown the configuration of FIG. 12 corresponds to that of FIG. 5. In case of corresponding to the configuration of FIG. 6, neither the RGB combination section 310 nor the RGB separation section 330 is needed, and instead, the brightness and color signals are provided to the coordinate conversion memory 320.

Now, exemplary functional blocks of an imaging apparatus, to which one embodiment of the present invention is applied, are described with reference to FIG. 13. The imaging apparatus additionally includes an operation section, an image storage, and an image display (a monitor), not shown. The imaging apparatus is used as a camera mounted on a car but is not limited thereto.

Figure 13:
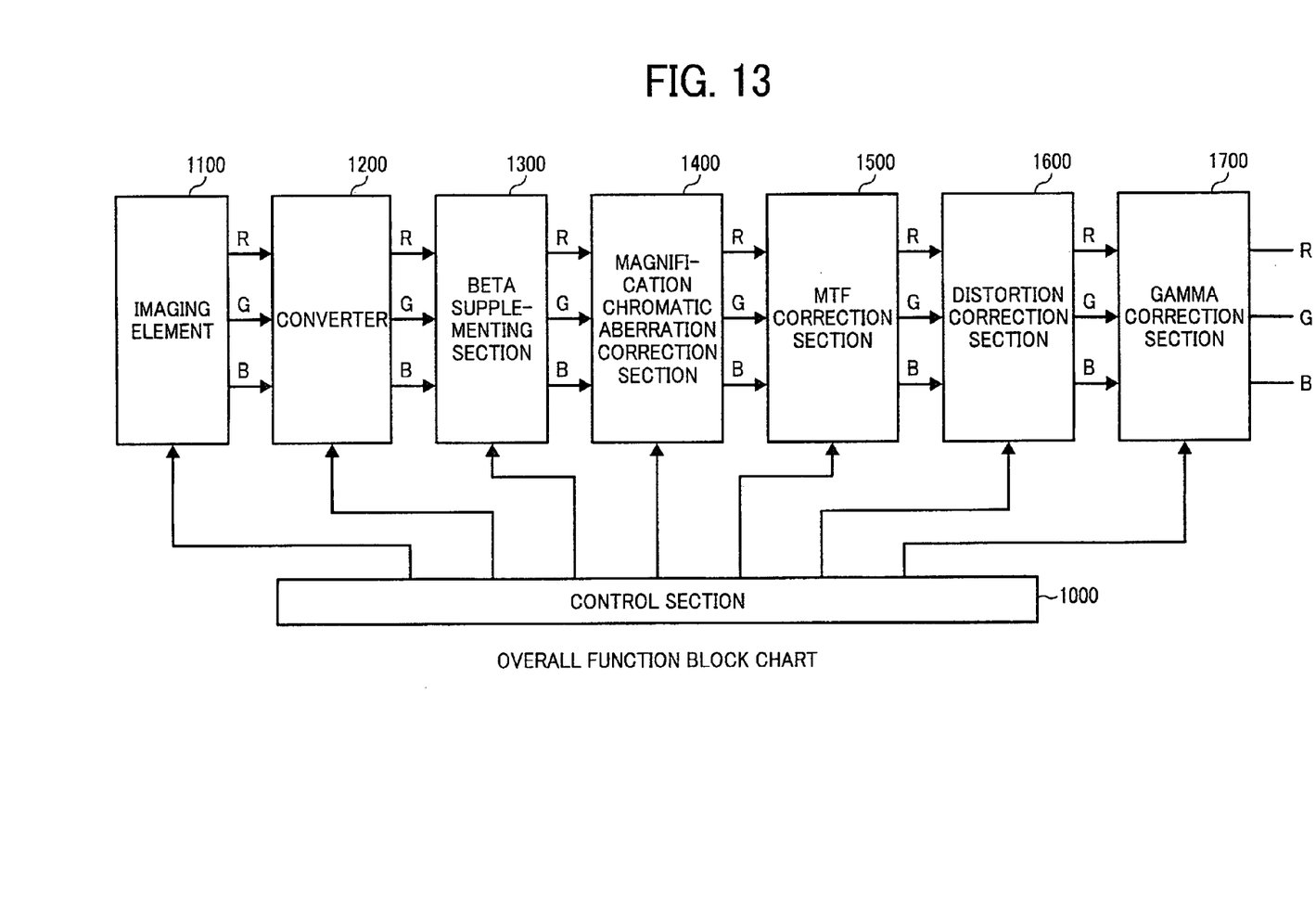

In FIG. 13, a control section 1000 provides each of sections with necessary control signals, such as a clock, a horizontally/vertically synchronizing signal, etc., and controls each of the sections in a pipe line manner.

An imaging element 1100 includes a CCD or a CMOS sensor or the like for converting an optical image into an electric signal (image data), which is obtained using an optical system, not shown, having a wide angle and a large magnification chromatic aberration and distortion.

The imaging element 1100 includes a color filter of Beyer arrangement, and thus RGB image data in the Beyer arrangement are sequentially outputted in accordance with coordinate values (x, y) provided by the control section 1000. Further, the control section 1000 deviates the coordinate values (x, y) provided to the imaging element 1100 by a prescribed time one after another and provides those to a subsequent step. Such coordinate values (x, y) can be generated in the imaging element 1100 based on an input of a clock and a horizontally or vertically synchronizing signal, and is outputted one by one to the subsequent steps.

An A/D converter 1200 converts the RGB image data of Beyer arrangement outputted from the imaging element 1100 in a state of an analog signal into a digital signal and launches the same to a Beyer complement section 1300. The digital signal of each of the RGB includes 8 bit.

In general, an AGC circuit, not shown, is arranged in a previous step of the A/D converter 1200. A lightness of the photographing subject can be detected by checking an amount of gain of the AGC circuit.

A Beyer supplementing section 1300 receives the RGB image data of the Beyer arrangement of the digital signals, and generates image data of the entire coordinate positions by means of linear supplement per each of the RGB independently. The Beyer complement section 1300 then launches the image data to a magnification chromatic aberration correction section 1400.

Although the imaging element having the color filer of the Beyer arrangement is employed as mentioned above, the present invention is also effective to that having the other color filter arrangement, such as a CMYG arrangement, a RGB+Ir (infrared) arrangement, etc. The imaging element having such a four color filter arrangement further necessitates a low latency memory or a four port RAM for magnification chromatic aberration correction as different from a three-color type, such as a RGB, etc.

The magnification chromatic aberration correction section 1400 receives Beyer supplemented R, G and B image data and applies coordinate conversion (e.g. magnification chromatic aberration coordinate conversion) independently to each of the RGB color components using a prescribed polynomial formula, and outputs RGB image data subjected to magnification chromatic aberration correction. As mentioned earlier, to execute coordinate conversion for the magnification chromatic aberration correction, a memory of small capacity and low latency or a SRAM having a low capacity and plural ports can be utilized.

A MTF correction section 1500 receives RGB image data subjected to the magnification chromatic aberration correction and applies MTF correction processing to a brightness signal using a FIR filter, and outputs RGB image data subjected to the MTF correction. As mentioned earlier, by only applying high band emphasis filtering (e.g. the MTF correction) to the brightness signal, a high quality image suppressing color noise can be obtained. The MTF correction section 1500 can apply smoothing filtering to the color signal in parallel to the high band emphasis filtering to the brightness signal.

A distortion correction section 1600 receives the RGB image data subjected to the magnification chromatic aberration and MTF corrections, and commonly applies coordinate conversion (distortion coordinate conversion) to respective RGB color components using a prescribed polynomial formula or the like, and outputs RGB image data subjected to the distortion correction. As mentioned earlier, to execute the coordinate conversion for the distortion correction, a large capacity (e.g. at most one screen amount) but high latency memory, such as a DRAM, etc., can be used. Because, only one port is needed as different from a memory for magnification chromatic aberration correction use.

A gamma correction section 1700 receives the RGB image data outputted from the distortion correction section, and applies prescribed gamma correction processing thereto using a LUT or the like prepared for each of RGB, and outputs RGB image data subjected to the gamma correction. The image data outputted from the gamma correction section 1700 is displayed on a display section, not shown.

Owing to the configuration of FIG. 13, a high quality compact circuit and low cost imaging system can be provided to the optical system having the magnification chromatic aberration and the distortion. The magnification chromatic aberration correction section 1400 can be a magnification chromatic aberration/distortion correction section capable of simultaneously correcting the magnification chromatic aberration and distortion. In such a situation, the distortion correction section 1600 can be omitted. Further, the gamma correction section 1700 can be arranged right after the Beyer correction section 1300.

Further, the above-mentioned processing function of the image processing apparatus shown in FIGS. 1 and 3-6 or the like can be established by computer program. Also, the image processing method can be implemented by the computer that reads the program in the present invention. Otherwise, the above-mentioned operation procedure can be established by computer program. Also, the image processing method of the present invention can be implemented by the computer that reads the program. Such program can be recorded in a computer readable medium, such as a FD, a MO, a ROM, a memory card, a CD, a DVD, a removable Disc, etc., to be preserved or offered. Further, the program can be distributed through a network such as an intra net, etc.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An image processing method of processing an image obtained using an optical system having a wide field angle and a large magnification chromatic aberration, said method comprising the steps of:
    applying magnification chromatic aberration correction processing to the image by storing color components of the image in coordinate conversion memories and performing a coordinate conversion on the color components stored in the coordinate conversion memories, each of the coordinate conversion memories including a memory area having a size that corresponds to a maximum amount of deviation in the color components in comparison to a reference color component caused by the magnification chromatic aberration;
    applying separation processing to the image after the step of applying the magnification chromatic aberration correction for separating the image into a brightness signal and a color signal; and
    applying a high band emphasis processing only to the brightness signal after the step of applying the separation processing.

2. The image processing method as claimed in claim 1, further comprising the step of combining the brightness signal subjected to the high band emphasis processing and the color signal.

3. The image processing method as claimed in claim 2, further comprising the step of smoothing the color signal in parallel to the high band emphasis processing of the brightness signal.

4. The image processing method as claimed in claim 3, further comprising the step of changing an intensity of the smoothing in accordance with a luminance of a photographic subject.

5. The image processing method as claimed in claim 3, wherein said step of smoothing the color signal is executed only when the luminance decreases to a prescribed dark level.

6. The image processing method as claimed in claim 1, wherein said magnification chromatic aberration correction is executed by partially converting coordinates of multi color components in the step of executing the magnification chromatic aberration correction processing.

7. The image processing method as claimed in claim 6, and wherein a coordinate conversion amount of a first color component is calculated with reference to a coordinate of the reference color component, and wherein a coordinate conversion amount of a second color component is calculated in accordance with the coordinate conversion amount of the first color component.

8. The image processing method as claimed in claim 7, further comprising:
   a step of applying distortion correction processing to the image separately from the step of applying magnification chromatic aberration correction processing.

9. The image processing method as claimed in claim 8, wherein said step of applying distortion correction processing is executed after the step of applying the high band emphasis processing.

10. An image processing apparatus for processing an image obtained by an optical system having a wide field angle and a large magnification chromatic aberration, comprising:
   a magnification chromatic aberration correction device configured to correct magnification chromatic aberration per color component by storing color components of the image in coordinate conversion memories and performing a coordinate conversion on the color components stored in the coordinate conversion memories, each of the coordinate conversion memories including a memory area having a size that corresponds to a maximum amount of deviation in the color components in comparison to a reference color component caused by the magnification chromatic aberration, an amount of coordinate conversion performed for a first color component calculated with reference to a coordinate of the reference color component, and an amount of coordinate conversion performed for a second color component calculated in accordance with the amount of coordinate conversion performed for the first color component;
   a separation device configured to separate the image subjected to the magnification chromatic aberration correction into brightness and color signals; and
   a MTF correction device including a filter configured to emphasize a high band of the brightness signal.

11. The image processing apparatus as claimed in claim 10, further comprising a combining device configured to combine the brightness signal subjected to the high band emphasis and the color signal.

12. The image processing apparatus as claimed in claim 10, wherein said MTF correction device further comprising a filter configured to smooth the color signal.

13. The image processing apparatus as claimed in claim 12, wherein an intensity of smoothing by the filter is changed in accordance with the lightness of a photographic subject.

14. The image processing apparatus as claimed in claim 12, wherein said filter becomes effective when the lightness of a photographic subject decreases to a prescribed dark level.

15. The image processing apparatus as claimed in claim 14, wherein said magnification chromatic aberration correction device partially converts coordinates of multi color components.

16. The image processing apparatus as claimed in claim 15, wherein said magnification chromatic aberration correction device calculates a coordinate conversion amount of a first color component with reference to a coordinate of the reference color component, and calculates a coordinate conversion amount of a second color component in accordance with the coordinate conversion amount of the first color component.

17. The image processing apparatus as claimed in claim 16, further comprising a distortion correction device configured to correct distortion of the image.

18. The image processing apparatus as claimed in claim 17, wherein said distortion correction device is arranged in the later step of the MTF correction device.

* * * * *